(12) United States Patent
Bauer

(10) Patent No.: US 10,558,439 B2
(45) Date of Patent: Feb. 11, 2020

(54) AUTOMATIC REFERENCE COUNTING

(71) Applicant: Embarcadero Technologies, Inc., Austin, TX (US)

(72) Inventor: Allen Bauer, Scotts Valley, CA (US)

(73) Assignee: Embarcadero Technologies, Inc., Austin, TX (US)

(*) Notice: Subject to any disclaimer, the term of this patent is extended or adjusted under 35 U.S.C. 154(b) by 10 days.

(21) Appl. No.: 15/868,806

(22) Filed: Jan. 11, 2018

(65) Prior Publication Data

US 2018/0129489 A1 May 10, 2018

Related U.S. Application Data

(63) Continuation of application No. 15/661,497, filed on Jul. 27, 2017, now Pat. No. 9,891,899, which is a continuation of application No. 14/082,005, filed on Nov. 15, 2013, now Pat. No. 9,747,088.

(60) Provisional application No. 61/814,763, filed on Apr. 22, 2013.

(51) Int. Cl.
*G06F 8/41* (2018.01)
*G06F 12/02* (2006.01)

(52) U.S. Cl.
CPC ........ *G06F 8/4434* (2013.01); *G06F 12/0261* (2013.01)

(58) Field of Classification Search
None
See application file for complete search history.

(56) References Cited

U.S. PATENT DOCUMENTS

| 5,274,804 | A  | * | 12/1993 | Jackson ............... G06F 12/0253 |
| 5,392,432 | A  |   | 2/1995  | Engelstad et al. |
| 5,398,334 | A  | * | 3/1995  | Topka ................ G06F 12/0261 |
| 5,535,390 | A  |   | 7/1996  | Hildebrandt |
| 5,572,730 | A  |   | 11/1996 | Oda |
| 5,808,911 | A  |   | 9/1998  | Tucker et al. |
| 6,144,965 | A  |   | 11/2000 | Oliver |
| 6,182,107 | B1 |   | 1/2001  | Atsatt |
| 6,256,730 | B1 |   | 7/2001  | Decarmo |
| 6,473,773 | B1 |   | 10/2002 | Cheng et al. |
| 6,526,422 | B1 |   | 2/2003  | Flood et al. |
| 6,584,478 | B1 | * | 6/2003  | Spertus ............... G06F 9/5016 |
| 6,681,263 | B1 |   | 1/2004  | King |
| 7,237,237 | B2 | * | 6/2007  | Foti .................... G06F 12/0261 707/999.202 |
| 7,308,466 | B2 |   | 12/2007 | Houldsworth |
| 7,584,232 | B2 |   | 9/2009  | Guo |
| 7,660,961 | B2 |   | 2/2010  | Printezis et al. |

(Continued)

*Primary Examiner* — Chat C Do
*Assistant Examiner* — Douglas M Slachta

(57) ABSTRACT

In a method for automatic reference counting, source code with automatic reference counting is executed, such that the source code executes an object destructor on demand irrespective of whether there are live references to an object, wherein the object destructor marks the object as disposed without freeing a portion of memory associated with the object and without impacting validity of a reference to the object. The object destructor is executed during execution of the source code, wherein the object destructor is for use in an explicit disposal process of a reference associated with the source code, wherein the object destructor collects a reference, removes the reference from being a live reference, and marks the object as disposed of.

20 Claims, 3 Drawing Sheets

Process 300

(56) References Cited

U.S. PATENT DOCUMENTS

| | | | |
|---|---|---|---|
| 7,769,791 B2 | 8/2010 | Doherty et al. | |
| 7,962,644 B1* | 6/2011 | Ezerzer | H04M 3/5191 |
| | | | 370/352 |
| 8,103,706 B2 | 1/2012 | Joisha | |
| 8,504,596 B2 | 8/2013 | Garst | |
| 8,725,974 B2 | 5/2014 | Dice et al. | |
| 9,747,088 B2 | 8/2017 | Bauer | |
| 2002/0111996 A1* | 8/2002 | Jones | H04L 63/0428 |
| | | | 709/203 |
| 2003/0033320 A1 | 2/2003 | Houldsworth | |
| 2003/0101432 A1* | 5/2003 | Allison | G06F 9/4488 |
| | | | 717/114 |
| 2003/0135850 A1 | 7/2003 | Miloushev et al. | |
| 2006/0037026 A1* | 2/2006 | Doherty | G06F 12/0261 |
| | | | 719/310 |
| 2006/0218561 A1* | 9/2006 | Moir | G06F 12/0261 |
| | | | 719/316 |
| 2007/0203960 A1* | 8/2007 | Guo | G06F 12/0269 |
| 2008/0172538 A1 | 7/2008 | Dice et al. | |
| 2008/0250088 A1 | 10/2008 | Printezis et al. | |
| 2009/0030958 A1 | 1/2009 | Garst | |
| 2009/0094300 A1 | 4/2009 | Joisha | |
| 2011/0099537 A1* | 4/2011 | Van Ness | G06F 9/541 |
| | | | 717/120 |
| 2012/0246203 A1 | 9/2012 | Pawar et al. | |
| 2013/0124569 A1* | 5/2013 | Richter | G06F 16/162 |
| | | | 707/792 |
| 2014/0289716 A1 | 9/2014 | Adl-Tabatabai et al. | |
| 2014/0317607 A1 | 10/2014 | Adi-Tabatabai et al. | |

* cited by examiner

Process
200

A SOURCE CODE IS SEARCHED FOR A PARTICULAR PATTERN VIA A COMPILER ASSOCIATED WITH A COMPUTER SYSTEM, WHEREIN THE SOURCE CODE IS WRITTEN IN AN EXISTING LANGUAGE AND WHEREIN THE PARTICULAR PATTERN IS FOR A REFERENCE ASSOCIATING AN OBJECT WITH A PORTION OF MEMORY.
202

THE PARTICULAR PATTERN IS RECOGNIZED AT THE COMPUTER SYSTEM.
204

THE PARTICULAR PATTERN IS REPLACED WITH AN AUTOMATIC REFERENCE COUNTING IMPLEMENTATION AT THE COMPUTER SYSTEM.
206

THE SOURCE CODE WITH THE AUTOMATIC REFERENCE COUNTING IMPLEMENTATION IS EXECUTED.
208

Fig. 2

Process
300

A SOURCE CODE IS CONVERTED, AT A COMPUTER SYSTEM, WRITTEN IN AN EXISTING LANGUAGE SUCH THAT AUTOMATIC REFERENCE COUNTING IS ENABLED FROM THE SOURCE CODE.
302

THE SOURCE CODE IS EXECUTED WITH THE AUTOMATIC REFERENCE COUNTING IMPLEMENTATION.
304

AN OBJECT DESTRUCTOR IS RUN AS PART OF THE SOURCE CODE WITH THE AUTOMATIC REFERENCE COUNTING ON DEMAND DURING THE EXECUTING, WHEREIN THE OBJECT DESTRUCTOR IS FOR USE IN AN EXPLICIT DISPOSAL PROCESS OF A REFERENCE ASSOCIATED WITH THE SOURCE CODE.
306

Fig. 3

AUTOMATIC REFERENCE COUNTING

RELATED APPLICATIONS

This application claims priority to and is a continuation of the co-pending patent application having application Ser. No. 15/661,497, entitled "AUTOMATIC REFERENCE COUNTING," with filing date Jul. 27, 2017, by Allen Bauer, and assigned to the assignee of the present invention, the disclosure of which is hereby incorporated herein by reference in its entirety.

The application with application Ser. No. 15/661,497 claims priority to and is a continuation of the then co-pending patent application having application Ser. No. 14/082,005, entitled "AUTOMATIC REFERENCE COUNTING," with filing date Nov. 15, 2013, by Allen Bauer, and assigned to the assignee of the present invention, the disclosure of which is hereby incorporated herein by reference in its entirety.

The application with application Ser. No. 14/082,005 claims priority to the then provisional patent application having Application No. 61/814,763, entitled "AUTOMATIC REFERENCE COUNTING," with filing date Apr. 22, 2013, which is herein incorporated by reference in its entirety.

FIELD OF THE TECHNOLOGY

The present technology relates generally to automatic reference counting in software programming.

BACKGROUND

Many electronic devices use software. The software is created by developers and may employ references and/or objects. During the executing of the software it may become necessary for the reference to destroyed or undergo a cleanup process. The cleanup process allows hardware resources to be allocated efficiently during the executing of the software. Software is developed through the use of programming languages which are compiled into code that is usable by electronic devices such as computer systems.

BRIEF DESCRIPTION OF DRAWINGS

FIG. 2 is flowchart for enabling automatic reference counting in accordance with embodiments of the present technology.

FIG. 3 is flowchart for enabling automatic reference counting in accordance with embodiments of the present technology.

Figure 1:
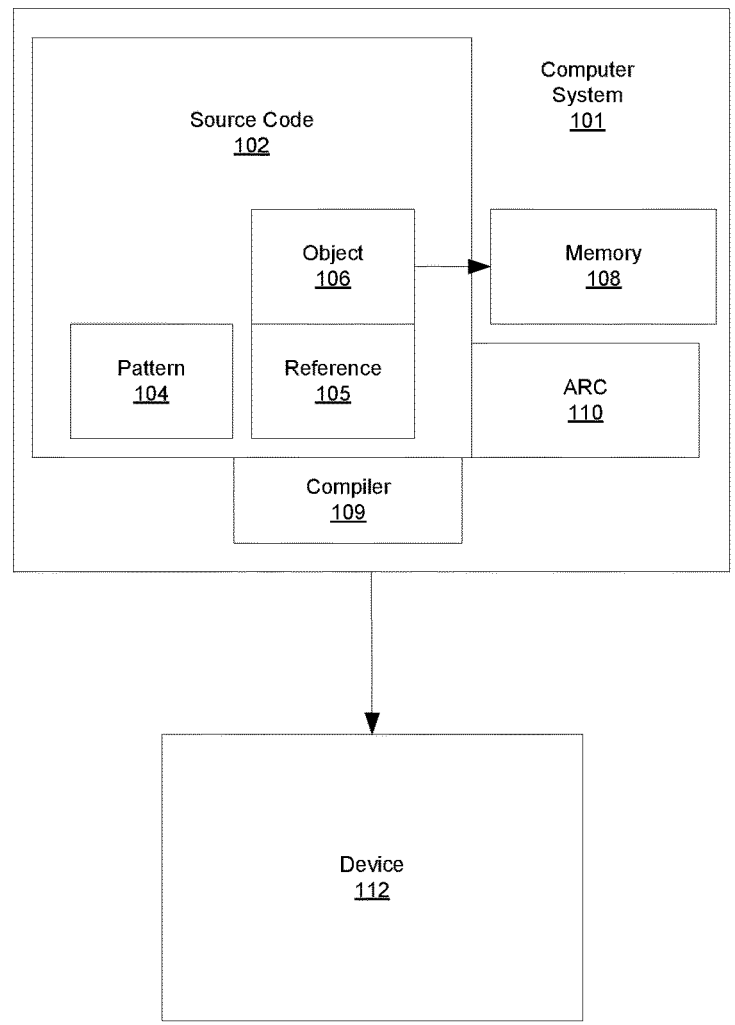
FIG. 1 is a block diagram of an environment for enabling automatic reference counting in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, user interface controls, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "searching," "recognizing," "replacing," "executing," "translating," "converting," "detecting," "associating," or the like, refer to the actions and processes of a computer system, or similar electronic computing device. The computer system or similar electronic computing device, such as a smart phone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Automatic Reference Counting

Reference counting is a way of tracking bits of memory in the execution of a software source code where the memory is hardware in a computer system or other device. The same piece or block of memory may be referenced in several locations by the software source code. To make sure that memory stays valid, part of the data in the application will account for the references. When a bit of memory is not referred to, the system can collect it or release it and re-allocate it. An existing programming language may not have reference counting per se or may only have parts that may be used by a developer for reference counting. The present technology is able to modify existing source code without reference counting to a source code with an automatic reference counting implementation. Automatic reference counting (ARC) is a technique for automatically tracking the bits of memory. A compiler will generate an extra count to ensure count of the references is maintained. After a reference is no longer valid then the code will remove it.

In one embodiment, automatic reference counting is a lightweight method of garbage collection (GC) memory management techniques that enables the developer to create software objects without requiring them to directly manage the memory of the object's lifecycle, in particular its destruction and disposal. This feature is highly desirable on resource constrained mobile platforms where available memory is at a premium. Even in ARC and GC environments, there is a need sometimes for deterministic way of initiating a "disposal" process. In other environments this is accomplished by forcing the developer to "invent" their own mechanism such as in Java, or implement a specific coding pattern such as in .NET.

Embodiments of the present technology are for enabling automatic reference counting in a source code. The source code may be written in an existing programming language that may not initially support automatic reference counting or the source code may not be written with automatic reference counting enabled. For example, the existing programming language may not have been developed with tools or structures in place for automatic reference counting. A developer may desire to add automatic reference counting to a source code but would be required to create the tools or structures for automatic reference counting for the source code from scratch. The present technology enables automatic reference counting in the source code written in the existing programming language without requiring the developer to create the tools or structures to do so. In one embodiment, the enabling of the automatic reference counting occurs hidden from the view of developer.

The process of enabling automatic reference counting in a source code may be described as converting or translating a software source code from a non-ARC software source code to a software source code with ARC enabled. The process may also be described as managing the lifetime of an object without the need to explicitly free the object where the object is created and destroyed within an application flow.

In one embodiment, the present technology enables automatic reference counting by searching a source code for a particular pattern. The particular pattern may be for a reference associating an object with a portion of memory. Once the particular pattern in recognized in the source code, the particular pattern is then replaced with an automatic reference counting implementation. The source code is then translated or converted and may then be executed with the automatic reference counting implementation. Thus the present technology allows source code written in an existing programming language to be converted to an ARC-enabled source code automatically where the source code and existing programming language were created without automatic reference counting.

Enabling Automatic Reference Counting

Referring to the figures, exemplary embodiments of the technology will now be described. The following description will focus on an embodiment of the present technology, which is implemented using a device with an operating environment or platform such as an operating system. The present technology, however, is not limited to any one particular device, operating system, environment, or platform. Instead, those skilled in the art will find that the system and methods of the present technology may be advantageously embodied on a variety of different platforms, including Microsoft Windows, iOS, Android, Macintosh, Linux, Solaris, UNIX, FreeBSD, and the like. Therefore, the description of the exemplary embodiments that follows is for purposes of illustration and not limitation.

FIG. 1 is a block diagram illustrating environment 100 which is an example environment comprising computer system 101. It should be appreciated that computer system 101 may be a standard or customized computer system and may be a desktop, laptop, tablet, handheld or other computer system. Computer system 101 may be employed by a developer for use of the present technology. Computer system 101 comprises memory 108 which is standard hardware memory. Bits of memory 108 may be referenced by source code 102 for use in the execution of source code 102. Source code 102 refers to source code 102 for a software application. In one embodiment, source code 102 comprises reference 105 which associates a bit of memory 108 with object 106 of source code 102. In one embodiment, source code 102 is able to execute on more than one device than computer system 101.

In one embodiment, source code 102 is developed or created using an existing programming language. The existing programming language may have been developed or created such that it does not have the tools or structures for automatic reference counting to be easily implemented. Thus a developer of source code 102 would need to program or create from scratch the tools and structure necessary to enable an automatic reference counting implementation of source code 102. It should be appreciated that source code 102 may be existing source code 102 that was programmed or created without an automatic reference counting implementation.

Source code 102 may have particular patterns of code in the actual source code such as pattern 104. The pattern calls out a specific function and may be related to a reference such as reference 105. In one embodiment, pattern 104 is reference 105 in source code 102. The present technology is able to search source code 102 for pattern 104. Source code 102 may contain multiple instances of a particular pattern. Compiler 109 is able to compile source code 102 into a machine usable code. In one embodiment, compiler 109 is used to search for the particular pattern. Once recognized the compiler, executing on computer system 101, replaces pattern 104 with an implementation employing ARC 110. ARC 110 is an automatic reference counting implementation. Once implemented, source code 102 with ARC 110 has been converted such that automatic reference counting is enabled for source code 102. Before the conversion, source code 102 may have been a non-ARC software application. A developer may issue a command for the conversion of source code 102 to a source code with an automatic reference counting implementation. However, the actual conversion may be hidden from the view of the developer. Thus, the present technology may operate to create a source code with an automatic reference counting implementation without the developer being required to create or program the automatic reference counting. In one embodiment, the source code with an automatic reference counting implementation may be executed at computer system 101. In one embodiment, the source code with an automatic reference counting implementation is sent to device 112 to be executed. For example, device 112 may be a mobile device with a mobile platform such as a smart phone. The present technology can move from one programming language to another such as C++, Objective C, Delphi, and others.

There may be times during the execution of a software source code where it is necessary to ensure that a block of memory is cleaned up meaning that a reference may be pointing to a bit of memory when it no longer need to. This prevents the bit of memory from being reference 105-allocated. This reference needs to be identified and cleaned up or destroyed. For example, a file system reference may need to be cleaned up. This may also be referred to as garbage collecting or disposing. In another example, in Delphi or C++ there is a destructor that destroys state of object and allows it to become available. Automatic reference counting can accomplish this cleanup task.

Some cleanup solutions employ a hidden flag to indicate whether a destructor should or should not destroy a reference. For example, a user may invoke a disposeof feature, the destructor may be called without that flag set, so all the destructors "run", but no memory is freed. The instance is also marked as having been "disposed" so that any subsequent call to disposeof is a no-op. All existing references to the instance remain valid. The normal ARC process for controlling the destruction/memory cleanup proceeds as normal and isn't disrupted.

In one embodiment, the reference is collected, not the object, and the automatic reference counting removes the reference from being a live reference. In one embodiment, the present technology separates disposal from destruction of references. For example, a dispose of command or technique does not destroy the reference but instead marks an object as disposed and executes as though the reference is destroyed. In this embodiment, the memory still exists and the references are alive but are flagged as disposed. The memory may be in an indeterminate state, but is returned to memory core and may be reallocated.

In one embodiment, there are live references that have not transitioned back to zero. The present technology may check if this live reference has been disposed and may trigger a run time error. Thus the present technology may be employed to highlight errors faster and be employed as a diagnostic tool. In one embodiment, the present technology is able to track information such as the type and layout of memory and metadata, which is similar to Run Time Type Information RTTI or may be described as reflection data. When an object or entity is released, it may still have references to other entities, the type information or metadata keeps track of these references and automatic reference counting may then operate to properly destroy or dispose of.

As references are transferred, the counters of references need to be handled which may be a problem if the counters are counting reference differently. Circular cycle or reference count which perpetuates a cycle that may keep the reference alive. Automatic reference counting operates to as a solution to this issue. In another embodiment, a "Weak reference" may be employed which keeps track of location where reference lives so that when other collect the memory, it knows location of other weak reference. The weak reference may then be flagged for destruction or dispose of.

In one embodiment, the present technology employs method pointers to point to a piece of code compiled in an application for conversion of a source to an automatic reference counting implementation. A method pointer may point to an object such that a data structure carries a reference to the memory that houses the data and also a reference to a method that is to be called. In one embodiment, all method pointers are designated as weak and are tracked similar to a weak reference. Thus, the method pointer may be weak by implication.

In one embodiment, the present technology separates the concepts of memory deterministic and object determinism. For example, the object may not be tied to the life of its memory in the present technology. In one embodiment, the implementation of ARC allows for retaining the existing "create try finally free" (CTFF) pattern. For transitional classes where the lifetime can be tied to the function in which it lives, the CTFF pattern isn't strictly necessary. In some cases, however, a more deterministic lifetime is necessary, so the CTFF pattern can be used.

The following describes different types of references. The different types of references may have identifiers specific to a programming language. For example, there may be identifiers specific to ObjectiveC or other programming languages. A strong identifier may be a default for any object instance reference. A weak identifier may be a type which handles the management of the weak reference. An autoreleasing identifier may only apply to function parameters. By default all instances passed as parameters are "autoreleasing". On function entry the reference count is incremented and on exit it is decremented. To override this behavior, use the "const" modifier on the parameter. This will have the same effect it has on string and interface parameter types. In this case the callee relies on the caller to maintain the lifetime of the instance.

There are some instances where a reference counted object as a return type will cause odd reference count problems. This is especially true for TObject.InitInstance and TObject.NewInstance. These methods must return a "raw" instance reference without the added refcount codegen. For these specific cases, the "unsafe" directive was resurrected from the Delphi for .NET compiler and re-purposed for an embodiment as a way to indicated to the compiler that this return value must be treated as a raw reference or pointer. In one embodiment, to mark a variable as a weak reference, the "unsafe" directive will shift to being an attribute [Unsafe].

In one embodiment, the risk of "Strong Reference Cycles" is very real. One solution is to introduce object reference variables that behave differently than a normal "strong" reference. A variable marked as weak will not cause the referenced object to be retained, rather it will simply be set to nil in the event that the variable is still in scope when the object is finally destroyed. This requires that the variable's location be actively tracked. As values are assigned to a weak variable, if it is currently holding a reference, that variable's location must be removed from being tracked against that instance and the location is then tracked against the new instance. When a weak reference is "finalized" it is set to nil and it's address is removed from the tracking table of the instance it is currently holding.

It should be appreciated that weak references can be set to nil at any point, even from another thread. Extreme care must be taken to ensure when accessing weak references. In one embodiment, a solution is that objects that cross threading boundaries are never referenced through a weak reference. As long as an object retains its thread affinity (i.e. is only accessed and managed from the thread on which it was created), race conditions and random crashes can be minimized.

In one embodiment, since a weak reference can be set to nil at any point, even as a result of same-thread processing, when using a weak reference, the weak reference is converted to a strong reference before using it and clearing it immediately after use.

In some embodiments such as Delphi 2, where reference counted long strings are employed, the compiler generates code and tables that describe how to properly initialize and finalize variables and fields of type 'string.' In subsequent embodiments, such as Delphi 3, this was expanded to include Variants, Interfaces and WideStrings. Eventually Dynamic Arrays were also added and most recently, UnicodeString. Finally, as this document points out, class instance references are now also included among those types previously referenced.

The tables used by the RTL to properly finalize a class, record, array, local variable, etc. are simply an array of records containing two fields. The first is a reference to the type information (RTTI) for the type of the field, and the second field is the offset in the containing structure for where the field to be finalized is located. Given the base address of the structure, which can be on the stack or heap, the memory address of the field can be calculated, and given the type information reference, the RTL knows how to specifically finalize that field.

In one embodiment, with the addition of being able to apply the weak attribute to a field, a field of a given type must be copied and/or finalized differently from fields that are strong references. This presented a problem since the aforementioned table only contains an offset and type reference. A strong field reference or weak field reference to the same type would generate the exact same type reference and the since they're different fields the offsets would obviously be different. However the RTL would be unable to distinguish the difference between the fields by merely looking at the corresponding entry in the table.

In one embodiment, in order to minimize the overall impact on the compiler and RTL, the entries in the finalization table remained the same. The difference is rather than interleaving strong and weak reference fields, they are segregated into different regions in the array with a "sentinel" marking the point between them. The RTL processes the finalization table linearly as an array of typeinfo/offset pairs. The compiler generates all the strong references into the first part of the array. If the structure contains any weak reference fields, a "sentinel" record consisting of two nil values (nil typeinfo and 0 offset field) will indicate that all entries following this point will be weak references. The finalization structure header contains a field indicating the number of items in the finalization array. If a structure includes any weak references, this count will include the sentinel entry as part of the total count.

In one embodiment, a programming language that can develop a source code with an automatic reference counting implementation, it is feasible to allow operators on classes. This would be different from prior solutions where operators are only allowed on records.

In an embodiment using a Delphi language solution, "Boxing" is the act of taking a "value-type" and wrapping it up into a class and moving it to the heap as a reference type. "Unboxing" does the opposite by extracting the value from the object instance. This would allow for the ability to safely cast an integer into a TObject. In one embodiment, instead of taking the *value* of the integer and reinterpreting the "bits" of an integer as a class reference, an actual TObject "wrapper" instance would be created and the value gets copied to the instance. The act of casting a TObject back into an integer, would reverse the process by safely checking whether the TObject instance is an Integer wrapper and then copy the value from it. The "box" (or wrapper) would be cleaned up automatically as the references are dropped.

Operations

FIG. 2 is a flowchart illustrating process 200 for enabling automatic reference counting, in accordance with one embodiment of the present invention. In one embodiment, process 200 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 200 is performed by devices and modules in FIG. 1.

At 202, a source code is searched for a particular pattern via a compiler associated with a computer system, wherein the source code is written in an existing language and wherein the particular pattern is for a reference associating an object with a portion of memory. For example, the computer system may be computer system 101 of FIG. 1 with source code 102 and compiler 109 searching for pattern 104 where pattern 104 is reference 105 associating object 106 to a portion of memory 108.

In one embodiment, the source code is initially a non-automatic reference counting source code. In one embodiment, the source code is translated or converted from the non-automatic reference counting source code to a software source code with automatic reference counting enabled. In one embodiment, the existing language was developed without automatic reference counting as a function of the existing language.

At 204, the particular pattern is recognized at the computer system.

At 206, the particular pattern is replaced with an automatic reference counting implementation at the computer system. This may be accomplished with ARC 110. In one embodiment, the automatic reference counting performs a cleanup of a reference automatically. In one embodiment, the automatic reference counting performs a cleanup of a reference automatically. In one embodiment, the automatic reference counting implementation is accomplished such that the source code can execute an object destructor on demand.

At 208, the source code with the automatic reference counting implementation is executed. The execution may occur at computer system 101 and/or device 112 which may be described as a second computer system.

In one embodiment, process 200 is hidden from the view of a developer. In one embodiment, process 200 may be implemented on a variety of different programming language such as C++, Objective C, Delphi, and others.

FIG. 3 is a flowchart illustrating process 300 for enabling automatic reference counting, in accordance with one embodiment of the present invention. In one embodiment, process 300 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 300 is performed by devices and modules in FIG. 1.

At 302, a source code is converted, at a computer system, written in an existing language such that automatic reference counting is enabled from the source code. For example, the computer system may be computer system 101 of FIG. 1 with source code 102 and compiler 109 searching for pattern 104 where pattern 104 is reference 105 associating object 106 to a portion of memory 108.

In one embodiment, the source code is initially a non-automatic reference counting source code. In one embodiment, the source code is translated or converted from the non-automatic reference counting source code to a software source code with automatic reference counting enabled. In one embodiment, the existing language was developed without automatic reference counting as a function of the existing language.

At 304, the source code is executed with the automatic reference counting implementation.

At 306, an object destructor is run as part of the source code with the automatic reference counting on demand during the executing, wherein the object destructor is for use in an explicit disposal process of a reference associated with the source code. In one embodiment, the automatic reference counting performs a cleanup of a reference automatically. In one embodiment, the automatic reference counting performs a cleanup of a reference automatically. In one embodiment, the automatic reference counting implementation is accomplished such that the source code can execute an object destructor on demand.

In one embodiment, process 300 is hidden from the view of a developer. In one embodiment, process 300 may be implemented on a variety of different programming language such as C++, Objective C, Delphi, and others.

While the technology is described in some detail with specific reference to embodiments and alternatives, there is no intent to limit the technology to a particular embodiment or specific alternatives. For instance, those skilled in the art will appreciate that modifications may be made to embodiments without departing from the teachings of the present technology.

Example Computer System Environment

The present technology may be carried out, associated with or otherwise practiced with a computer system. Portions of the present technology are composed of computer-readable and computer-executable instructions that reside, for example, in computer-usable media of a computer system or other user device such as computer system 101 and/or device 112 of FIG. 1. Described below is an example computer system or components that may be used for or in conjunction with aspects of the present technology such as the ability to run or create a three dimensional interface.

It is appreciated that that the present technology can operate on or within a number of different computer systems including general purpose networked computer systems, embedded computer systems, a personal computer such as a desktop computer, a laptop, a notebook, an electronic hand-held device, a personal digital assistant, a smart phone, a tablet computer, a net book, user devices, and the like. The computer system is well adapted to having peripheral computer readable media such as, for example, a floppy disk, a compact disc, flash memory and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smart phone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for automatic reference counting, said method comprising:
   executing source code with automatic reference counting, such that said source code executes an object destructor on demand irrespective of whether there are live references to an object, wherein said automatic reference counting marks said object as disposed without freeing a portion of memory associated with said object and without impacting validity of a reference to said object; and
   executing said object destructor on demand during said executing said source code, wherein said object destructor is for use in an explicit disposal process of a reference associated with said source code, wherein said object destructor collects a reference, removes said reference from being a live reference, and marks said object as disposed of.

2. The method as recited in claim 1, further comprising: continuing to execute said source code as though said reference is destroyed without changing a reference count of said reference.

3. The method as recited in claim 1, further comprising: continuing to execute said source code as though said reference is destroyed without changing a location of said reference.

4. The method as recited in claim 1, wherein said executing said object destructor during said executing said source code comprises:
   marking of said object as disposed by said object destructor on demand based on said source code irrespective of whether there are live references to said object and without impacting validity of said reference to said object.

5. The method as recited in claim 1, wherein said automatic reference counting performs a cleanup of a reference automatically.

6. The method as recited in claim 1, wherein said reference is a weak reference.

7. The method as recited in claim 6, further comprising: responsive to collecting said portion of memory associated with said object, disposing of said weak reference.

8. The method as recited in claim 1, wherein said explicit disposal process of said object destructor is run once for said reference associated with said source code.

9. The method as recited in claim 1, further comprising: responsive to collection of all references to said object, freeing said portion of memory associated with said object.

10. A non-transitory computer-usable storage medium having instructions embodied therein that when executed cause a computer system to perform a method for automatic reference counting, said method comprising:

executing source code with automatic reference counting, such that said source code executes an object destructor on demand irrespective of whether there are live references to an object, wherein said automatic reference counting marks said object as disposed without freeing a portion of memory associated with said object and without impacting validity of a reference to said object; and executing said object destructor on demand during said executing said source code, wherein said object destructor is for use in an explicit disposal process of a reference associated with said source code, wherein said object destructor collects a reference, removes said reference from being a live reference, and marks said object as disposed of.

11. The non-transitory computer-usable storage medium as recited in claim 10, said method further comprising:
continuing to execute said source code as though said reference is destroyed without changing a reference count of said reference.

12. The non-transitory computer-usable storage medium as recited in claim 10, said method further comprising:
continuing to execute said source code as though said reference is destroyed without changing a location of said reference.

13. The non-transitory computer-usable storage medium as recited in claim 10, wherein said executing said object destructor during said executing said source code comprises:
marking of said object as disposed by said object destructor on demand based on said source code irrespective of whether there are live references to said object and without impacting validity of said reference to said object.

14. The non-transitory computer-usable storage medium as recited in claim 10, wherein said automatic reference counting performs a cleanup of a reference automatically.

15. The non-transitory computer-usable storage medium as recited in claim 10, wherein said reference is a weak reference.

16. The non-transitory computer-usable storage medium as recited in claim 15, said method further comprising:
responsive to collecting said portion of memory associated with said object, disposing of said weak reference.

17. The non-transitory computer-usable storage medium as recited in claim 10, wherein said explicit disposal process of said object destructor is run once for said reference associated with said source code.

18. The non-transitory computer-usable storage medium as recited in claim 10, said method further comprising:
responsive to collection of all references to said object, freeing said portion of memory associated with said object.

19. A method for of automatic reference counting, said method comprising:
executing source code with an automatic reference counting implementation, wherein said automatic reference counting marks an object as disposed without freeing a portion of memory associated with said object and without impacting validity of a reference to said object; and running an object destructor as part of said source code with said automatic reference counting on demand during said executing, wherein said object destructor is for use in an explicit disposal process of a reference associated with said object of said source code, wherein said object destructor collects a reference and removes said reference from being a live reference without freeing a portion of memory associated with said object, and wherein marking of said object as disposed by said object destructor is executed on demand based on said source code irrespective of whether there are live references to said object and without impacting validity of said reference to said object.

20. The method of claim 19, further comprising:
responsive to collection of all references to said object, freeing said portion of memory associated with said object.

* * * * *